No. 694,430. Patented Mar. 4, 1902.
R. SCHROEDER.
ATTACHMENT FOR THRESHING MACHINES.
(Application filed Aug. 21, 1901.)
(No Model.)
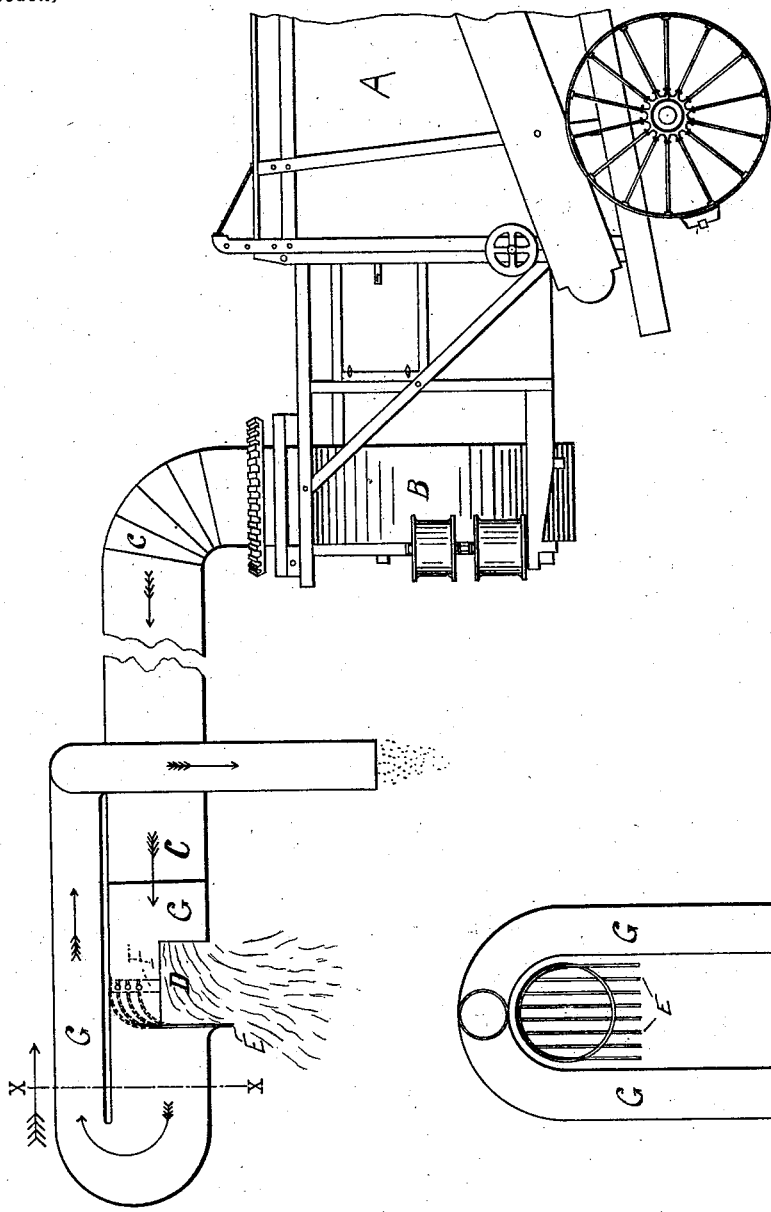
WITNESSES:
Richard Schroeder.
INVENTOR
BY
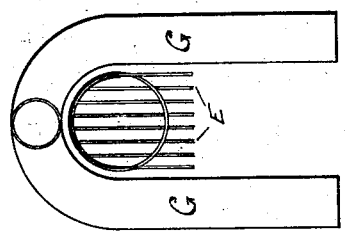
ATTORNEYS.

UNITED STATES PATENT OFFICE.

RICHARD SCHROEDER, OF WALCOTT, IOWA.

ATTACHMENT FOR THRESHING-MACHINES.

SPECIFICATION forming part of Letters Patent No. 694,430, dated March 4, 1902.

Application filed August 21, 1901. Serial No. 72,807. (No model.)

*To all whom it may concern:*

Be it known that I, RICHARD SCHROEDER, a citizen of the United States of America, and a resident of Walcott, in the county of Scott and State of Iowa, have invented a certain new and useful Attachment for Threshing-Machines; and I do declare the following specification, taken in connection with the drawings making a part of the same, to be a full, clear, and exact description thereof.

My invention relates to threshing-machines, and particularly to machines of that class which are equipped with what is ordinarily known as a "wind-stacker;" and its objects are to provide means whereby the air-blast, which by means of a blower is injected into the straw-conveying tube, may be directed away from the straw as the latter reaches the place of exit in said tube; to provide means whereby the straw after it has reached the place of exit in the straw-conveyer may drop upon the ground or stack gently and without being blown about by the blast of air which carries the straw from the blower down through the straw-conveyer; to provide an attachment to the usual straw-conveying tube of a wind-stacker whereby the dust and chaff which, with the straw, is driven into said tube through the action of the air-blast will be separated from the straw and will be conveyed through a tube beyond the point where the straw falls upon the stack and be deposited a suitable distance from the straw-stack.

Referring to the drawing, Figure 1 is a side elevation of a portion of a threshing-machine, showing the drum in which the fan or blower is located and the wind-stacker with my invention attached thereto. Fig. 2 is a sectional front view of my attachment, taken on the line *x x* of Fig. 1 and viewed in the direction of the upper arrow.

A is the body of the threshing-machine; B, the drum in which is located the blower, operated in the usual manner.

C is the tube or chute through which the straw is driven by the action of the air-blast from the blower.

D indicates the opening in the straw-chute from which the straw is deposited on the ground or stack.

E represents a series of strips or rods whose upper ends are secured to a strap F and whose lower ends project downwardly, so as to prevent the straw from passing beyond said strips and to direct the straw downward through the opening D. The strap F may be secured to the upper portion of the inside of the straw-chute by rivets or other suitable means.

G is the air-tube, which I attach to the straw-tube or make integral therewith. This air-tube will preferably extend a short distance beyond the point where the straw is discharged and then be curled back over the top of the straw-tube for some distance. It is then divided, one branch extending downward on either side of the straw-tube, substantially as shown in the drawings.

From the description given it will be apparent that the straw, after it has been threshed in the usual way and directed into the straw-tube by the action of the blower, will be driven in the direction of the arrows until it reaches the opening D, when it will drop downward, being prevented from entering the air-tube G by the bars E. The air-blast, however, and the chaff and dust which enter the straw-tube with the straw will pass through the parallel spaces between the bars E and will be carried through the air-tube G in the direction of the curved arrow through the downwardly-extending branches to the outlets, where the air will escape and the dust and chaff be deposited. Thus the dust and agitation of the straw at the stack and much of the discomfort of the person working on the straw-stack are obviated.

I do not wish to be understood as limiting my invention to the particular means here pointed out and illustrated, as a wire screen or any other well-known means may be substituted for the bars E, and changes in the directions and form of the air-tube G will readily suggest themselves to the skilled mechanic.

Having thus described my invention, I claim as new and desire to secure by Letters Patent—

1. An attachment for a threshing-machine comprising an air-tube adapted to be secured to the outer end of the straw-conveyer on the threshing-machine; said air-tube provided with a lateral opening and a plurality of bars or strips secured in said tube so as to deflect the straw downwardly through said opening, said air-tube being so constructed and of such form as to direct the air-blast passing through the straw-conveyer away from the straw-stack for the purposes stated.

2. An attachment for a threshing-machine comprising an air-tube G adapted to be secured to the outer end of the straw-conveyer, said tube provided with the opening D, the bars E secured in the air-tube and projecting downward therethrough, said tube having two downwardly-extending branches with open bottoms, for the purposes stated and substantially as described.

In witness whereof I have signed my name, this 17th day of August, 1901, in the presence of two witnesses.

RICHARD SCHROEDER.

In presence of—
ALFRED C. MUELLER,
J. F. SCHROEDER.